United States Patent
Matousek et al.

(10) Patent No.: US 7,357,711 B1
(45) Date of Patent: Apr. 15, 2008

(54) SIEVE SUPPORT STRUCTURE FOR AN AGRICULTURAL COMBINE

(75) Inventors: Robert A. Matousek, Milan, IL (US); James R. Schmidt, Andale, KS (US); Kai Zhao, Willowbrook, IL (US); Jishan Jin, Naperville, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/636,933

(22) Filed: Dec. 11, 2006

(51) Int. Cl.
*A01F 12/32* (2006.01)
*B07B 1/00* (2006.01)

(52) U.S. Cl. ...................... 460/101; 209/408
(58) Field of Classification Search ............. 460/101, 460/102; 209/408, 403, 329, 394, 399, 412, 209/405; 210/388, 489
See application file for complete search history.

(56) References Cited

U.S. PATENT DOCUMENTS

| | | | |
|---|---|---|---|
| 210,243 A | 11/1878 | Dildine | |
| 373,382 A | 11/1887 | Truesdale | |
| 925,623 A * | 6/1909 | Closz | 209/394 |
| 2,181,605 A | 11/1939 | Norvell | 209/408 |
| 2,247,557 A | 7/1941 | Medley | 130/30 |
| 2,345,947 A | 4/1944 | Parks | 209/408 |
| 2,413,382 A * | 12/1946 | Sargent et al. | 209/394 |
| 4,482,455 A | 11/1984 | Humphrey | 209/319 |
| 5,851,393 A | 12/1998 | Carr et al. | 210/489 |
| 6,325,216 B1 | 12/2001 | Seyffert et al. | 209/408 |
| 6,726,029 B2 | 4/2004 | Okabayshi et al. | 210/338 |
| 2003/0130019 A1* | 7/2003 | Mammen et al. | 460/101 |
| 2004/0222135 A1 | 11/2004 | Olsen et al. | 209/408 |

* cited by examiner

*Primary Examiner*—Árpád Fábián Kovács
(74) *Attorney, Agent, or Firm*—Michael G. Harms; John William Stader; Patrick M. Sheldrake

(57) ABSTRACT

A sieve support structure including an elongate first rail, an elongate second rail, and rigid elongate compression members pivotally connected to and extending between the first and second rails at longitudinally spaced locations thereal-ong, wherein the rails and the compression members form a rail assembly having a predetermined shape bounding a correspondingly shaped space, the rail assembly being configured for supporting a sieve of a cleaning system in at least substantially covering relation to the space, the structure including elongate tension members extending generally diagonally through the space and having opposite end portions connected to the first and second rails and being tensioned so as to simultaneously urge the rails against the compression members so as to apply a compression force thereagainst for retaining the rail assembly in the predetermined shape in opposition to forces urging the assembly from the shape.

20 Claims, 9 Drawing Sheets

SIEVE SUPPORT STRUCTURE FOR AN AGRICULTURAL COMBINE

TECHNICAL FIELD

This invention relates generally to support structure for a grain cleaning sieve or sieves of a cleaning system of an agricultural combine, and more particularly, to a sieve support structure which is configured and adapted for resisting loading conditions, particularly unevenly distributed or offset loading conditions, which can exert stresses and strains on the structure urging deformation thereof such as racking or parallelogramming, and also possible resultant cracking thereof, for improving the structural life of the support structure and the sieve.

BACKGROUND ART

It is well known to provide a sieve or sieves in the grain cleaning system of an agricultural combine. Typically, the cleaning system will consist of two sieves, an upper or coarser sieve or chaffer located below the threshing mechanism or separator of the combine and having larger sieve openings for the passage of grain and smaller pieces of plant material therethrough but relatively little of the larger chaff, and a lower finer sieve located below the chaffer for receiving the grain and smaller pieces of plant material therefrom and having smaller sieve openings for passage of the grain therethrough but relatively little of the plant material. During operation of the sieves, a flow of air is directed upwardly therethrough for facilitating lifting and carrying away of lighter elements of the plant material from the upper surfaces of the sieves.

A typical sieve construction has an overall generally rectangular shape and includes a plurality of elongate parallel, pivotally mounted, sidewardly extending slats, each slat including a plurality of longitudinally spaced upwardly extending inclined fingers, the slats being pivotable through a range of open positions angularly oriented to horizontal for providing a corresponding range of openings or spaces between the fingers of adjacent ones of the slats. A typical sieve includes an adjusting member which contacts each of the slats, and a linkage and/or cable arrangement connected between the adjusting member and one or more manually or automatically movable adjusting elements or adjustors, in the latter instance, which can be moved by an actuator driven by an electrical, fluid, or other controller for moving the linkage or cable arrangement and member and thus changing the angular orientation of the slats and as a result, the opening size.

The sieves are typically each supported by a correspondingly rectangular shaped welded or fastened assembly commonly known as a sieve rail assembly. The sieve rail assemblies, in turn, are typically supported for rapid reciprocating movement in the fore and aft direction, as driven by a suitable drive element or actuator, such as a powered crank mechanism or the like. For instance, in one common construction the drive is connected in driving relation to the rail assembly supporting the upper sieve or chaffer, which upper rail assembly supports the rail assembly supporting the lower sieve for reciprocating movement opposite to reciprocating movement of the upper sieve. That is, as the upper sieve is driven in one direction, the lower sieve is driven by the upper sieve in the opposite direction.

In operation, grain, and plant and other material other than grain (MOG) will sometimes be deposited on the upper one of the sieves by the threshing mechanism in an uneven manner, particularly as the combine is traversing a hillside, so as to result in uneven loading conditions exerted against both the sieve and the sieve rail assemblies. Air flow upwardly through the sieve may also be uneven. Additionally, there may be some flexing of the structure of the combine supporting the sieve rail assemblies resulting from operation, for instance, from traversing furrows, ditches and other surface irregularities. As a result, the sieves and particularly the sieve rail assemblies are subjected to uneven stress conditions which can cause deformation thereof, particularly racking or parallelogramming of the rectangular shapes, which is a condition wherein the applied forces urge the rail assembly from its normal rectangular shape. Over time, this has been found to result in the development of fatigue cracks in the structural elements of the sieve rail assemblies, particularly, in the corners thereof, which are typically welded joints. The occurrence and/or extent of these conditions have been found to be greater in sieves of larger size, either in length, width, or both, which are used in larger combines, due to the greater crop loads processed by the sieves.

One contemplated option as a possible solution to the racking problem set forth above for retaining the desired rectangular shape of the sieve rail assemblies, has been to utilize large corner gussets for reinforcing the corner joints. However, this option is not favored, as it would result in decreased surface area for grain cleaning and could obstruct upward air flow through the sieves. Also, adding additional mass of large gussets will increase the moving mass of the rail assembly so as to increase the loading conditions exerted against the corner joints.

Accordingly, what is sought is a sieve support structure for an agricultural combine, which overcomes one or more of the problems and shortcomings set forth above.

SUMMARY OF THE INVENTION

According to the present invention, a support structure for a sieve of an agricultural combine which overcomes one or more of the problems and shortcomings set forth above, is disclosed.

According to a preferred aspect of the invention, the support structure includes an elongate first rail, an elongate second rail extending in desired, preferably at least generally parallel, relation to the first rail, and rigid elongate compression members pivotally connected to and extending between the first and second rails at longitudinally spaced locations therealong, respectively. The rails and the compression members form a rail assembly of a desired shape, here, preferably a generally rectangular shape, bounding a correspondingly shaped space configured for supporting a generally flat sieve, also of the desired shape, of a cleaning system of the combine in at least substantially covering relation to the rectangular shaped space. To hold the rail assembly together and retain the desired rectangular shape thereof in opposition to loading conditions urging deformation such as racking and/or parallelogramming of the assembly, elongate tension members extend generally diagonally through the rectangular space and have opposite end portions connected to the first and second rails, respectively, the tension members being tensioned so as to simultaneously urge the rails against the compression members so as to apply a compression load thereagainst sufficient to at least substantially resist the applied loads urging the assembly from its original shape.

As a result, the rail assembly is forceably maintained and held in its desired rectangular shape in opposition to forces and other applied loads urging deformation thereof, such as commonly present in the cleaning system environment, and, any deformation such as parallelogramming or racking of the rail assembly will be accommodated by the pivotal connection between the rails and compression members, such that cracking is avoided.

According to another preferred aspect of the invention, the rails of the rail assembly are supported along opposite sides of an interior cavity of a combine, and are driven reciprocatingly longitudinally by a suitable actuator, which can include, for instance, a crank mechanism, eccentric drive, or the like. As noted above, a threshing system of the combine, located above the cleaning system, can, from time to time, discharge threshed crop material onto a sieve supported by the rail assembly in an uneven manner, particularly, more toward one side, such that the side carrying the greater amount of crop material will have greater momentum compared to the other side, such that the rail assembly is subjected to forces tending to deform it from its desired original rectangular shape, typically toward a more parallelogram shape. Forces urging the rail assembly from its original shape can also be generated by bending and/or twisting of structural components of the combine resulting from loading conditions exerted thereagainst, such as can be generated when the combine traverses rough terrain, hillsides and the like. These loading conditions will be resisted by the combination of the tension of the tension members and resulting compression of the compression members. Any deformation such as racking or parallelogramming of the rail assembly which does result, will be limited, and will not be as likely to damage the rail assembly, as the pivotal connections between the rails and the compression members will accommodate the deformation by allowing deviation from the normal 90° angle between the joined members. And, when the forces and/or loading conditions acting to urge the structural elements of the rail assembly from its original shape are removed or diminished, the tension members will operate to return them to their original 90° position.

DETAILED DESCRIPTION OF THE INVENTION

Figure 1:
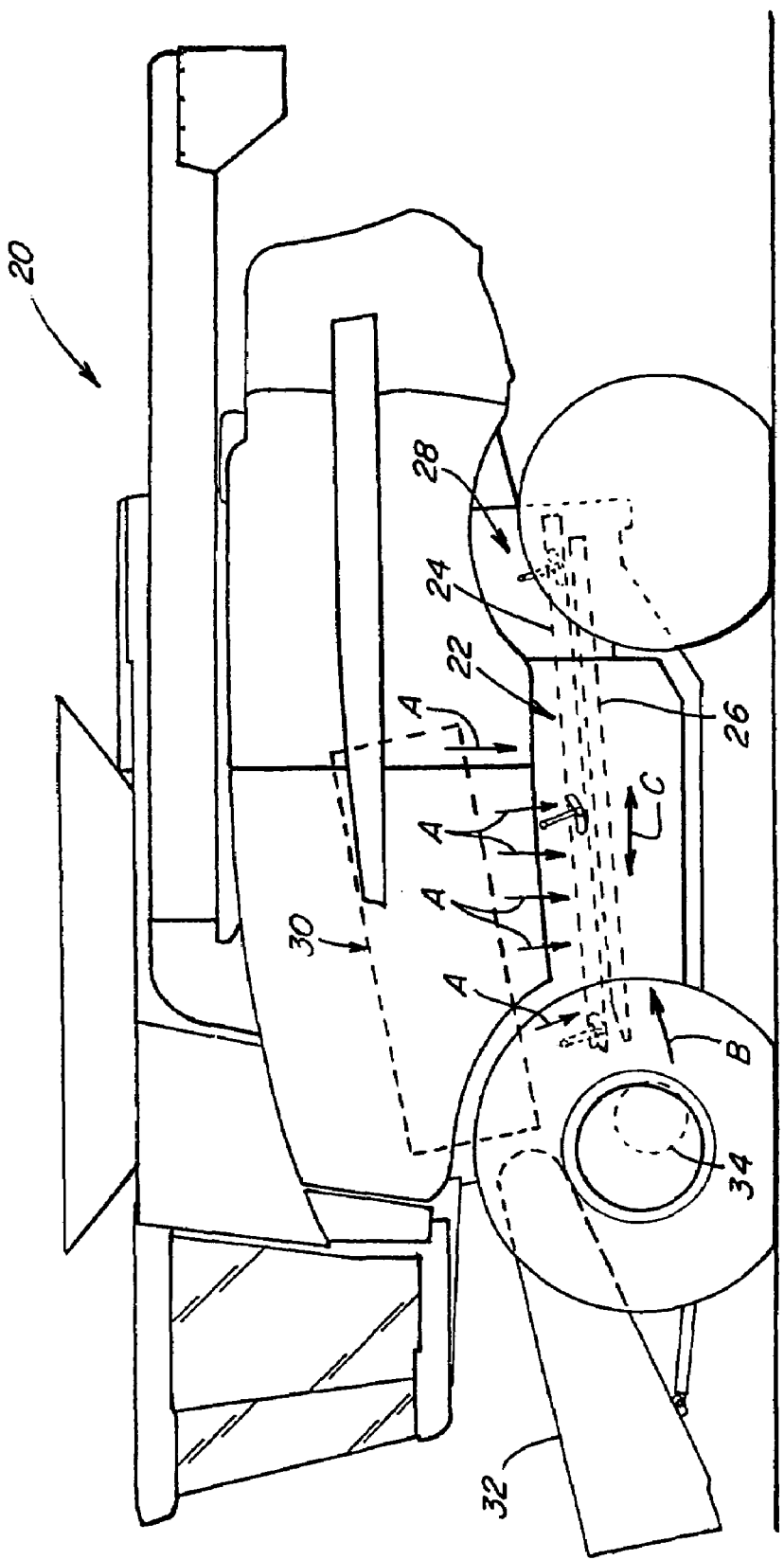
FIG. 1 is a simplified side elevational view of an agricultural combine including a cleaning system having sieves supported by a sieve support structure according to the present invention.

Referring now to the drawings, in FIG. 1 a conventional agricultural combine 20 is shown, illustrating generally the location of sieve support structure 22 constructed and operable according to the teachings of the present invention for supporting an upper sieve 24 and a lower sieve 26 of a cleaning system 28 of combine 20. Agricultural combine 20 generally includes a threshing mechanism or separator 30 operable for receiving crop material from a harvesting mechanism (not shown) on a front end 32 of combine 20, separator 30 being operable for separating smaller grains, seeds, pods and related plant material from larger stalks, stems, leaves, husks and other elements of the crop material, as well as vines, weeds and the like which may be present in the harvested crop material. The smaller material falls from separator 30, either directly or indirectly, to cleaning system 28, as generally illustrated by arrows A. Cleaning system 28 includes a fan 34 disposed forwardly of and just below upper and lower sieves 24 and 26, and operable for directing a flow of air, denoted by arrow B, upwardly and rearwardly through sieves 24 and 26. At the same time, sieves 24 and 26 are moved reciprocatingly forwardly and rearwardly, as denoted by arrows C (FIGS. 1, 2, 3 and 9), for cleaning pod fragments and other MOG from the grain, the grain falling through sieves 24 and 26 for collection, and the MOG being blown rearwardly from the cleaning system and rearwardly from the combine, or to a tailings system, if provided, in the well-known manner.

Figure 2:
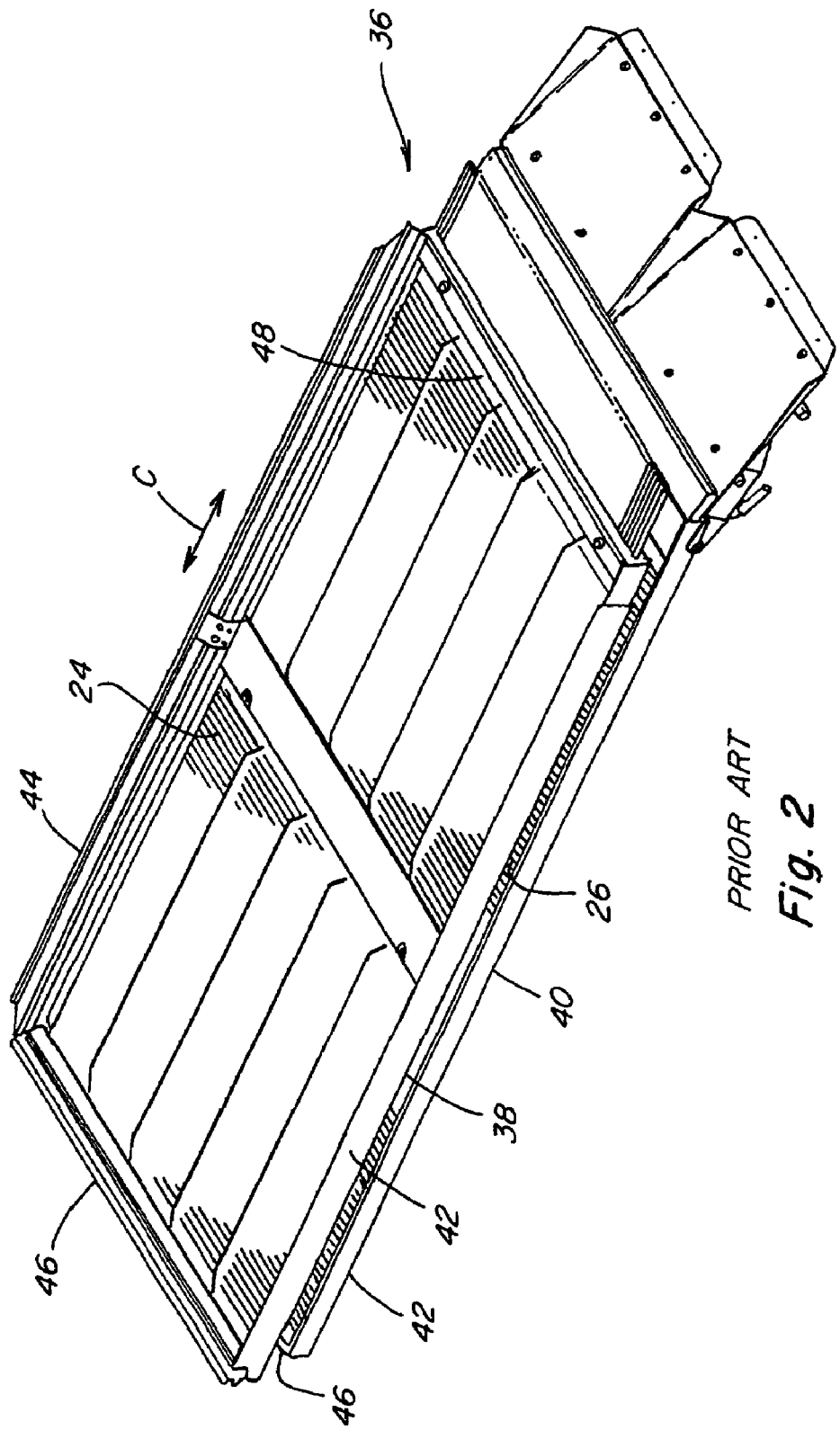
FIG. 2 is a simplified perspective view of a prior art support structure supporting the sieves of the combine of FIG. 1.
Figure 3:
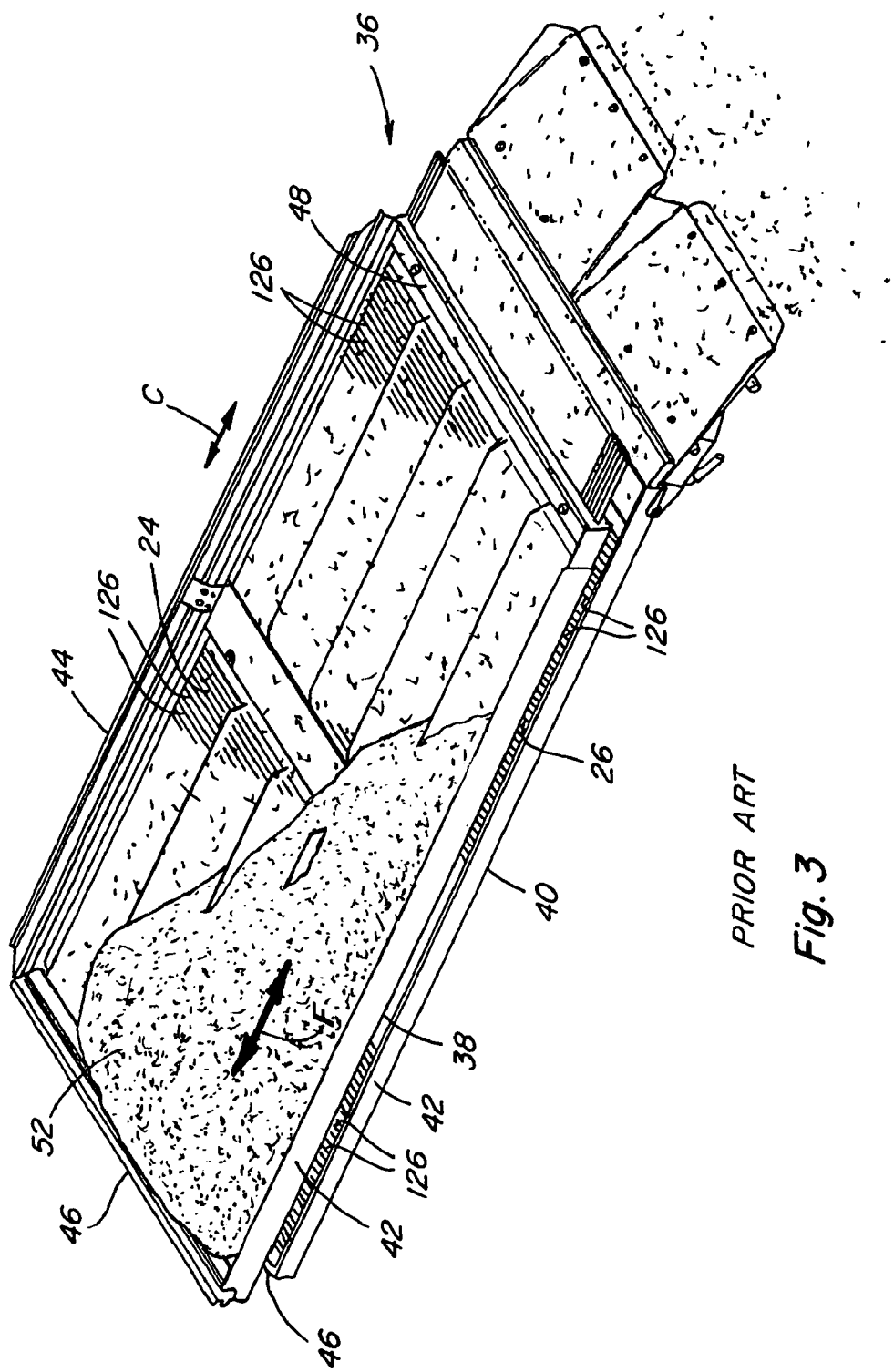
FIG. 3 is another simplified perspective view of the prior art support structure of FIG. 2 supporting the sieves of FIG. 1, illustrating an asymmetrical crop loading condition such as would exert uneven forces against an upper one of the sieves.

In FIGS. 2 and 3, sieves 24 and 26 are shown supported by a representative prior art support structure 36 typically subject to the problems set forth above under the Background Art heading, namely, deformation such as racking or parallelogramming, and fatigue cracking. Support structure 36 includes an upper sieve rail assembly 38 supporting upper sieve 24, and a lower sieve rail assembly 40 supporting lower sieve 26. Rail assembly 38 and rail assembly 40 each essentially comprises a rectangular structure including parallel, spaced apart side rails 42 and 44, configured for supporting the respective sieve 24 or 26, and connected by transversely extending cross members 46 and 48 which span the space between the rails 42 and 44. Each connection between a rail 42 or 44 and a cross member 46 or 48 is a rigid connection, such as by welding or fasteners.

Figure 9:
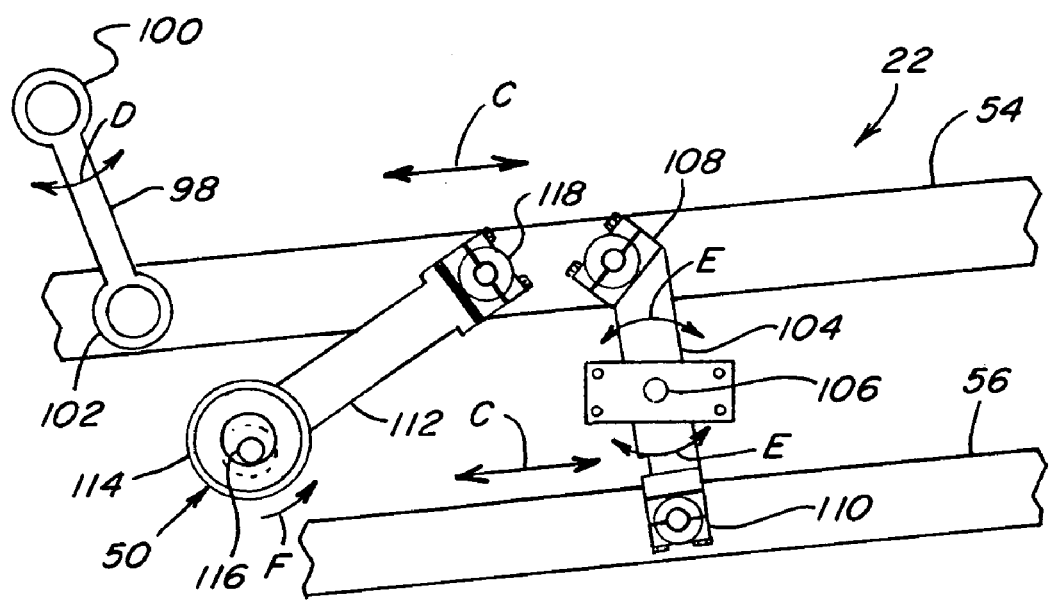
FIG. 9 is a fragmentary side view of the sieve support structure of the invention, illustrating apparatus for effecting reciprocating movements thereof.

In operation, upper and lower rail assemblies 38 and 40 will typically be rapidly reciprocatingly moved or vibrated in the forward and rearward directions, as denoted by arrows C, by a suitable actuator, such as actuator 50 illustrated in FIG. 9. In one typical arrangement, actuator 50 will be connected in reciprocating driving relation to upper rail assembly 38, and the lower assembly 40 will be suspended from rail assembly 38 by pivoting members, such that rail assemblies 38 and 40, and sieves 24 and 26 supported thereon, will be reciprocatingly moved in opposite directions. One or both of the rail assemblies can be driven from just one side, or both sides. As illustrated in FIG. 3, for any of several reasons, including, but not limited to, normal crop material distribution characteristics of the separator, or disposition on a side of a hill, during operation, crop material may be deposited on upper sieve 24 in an uneven manner, particularly, from side to side, as illustrated by the accumulated mass of crop material 52. Crop material distribution on lower sieve 24 may also be uneven. As a result, loads exerted against rail assemblies 38 and 40 during the reciprocating movements can be significantly uneven or unbalanced from side to side, as denoted by the large force arrow F shown disposed more toward one side of sieve 24 in FIG. 3, particularly as the sieve is accelerated, decelerated, and/or the direction of the movement of the sieves and rails is reversed. More particularly, during movement in one direction, the side of the sieve supporting the mass of crop material 52, and/or any other load or mass distribution that is imbalanced from side to side, will have momentum in that direction compared to the other side, which greater mass and momentum will oppose deceleration and change in the direction of movement to a greater extent than the mass and momentum of the other side of the sieve, resulting in exertion of uneven forces on the supporting rail assembly 38 or 40, which forces have been found to cause deformations of the rail assembly, such as the racking and parallelogramming discussed above. Another way of looking at this situation is that the center of gravity of the sieve and material on the sieve will be located more toward one side or the other, and possibly more toward one end or the other, and that this location can vary as conditions change. Such uneven forces have been found to stress and strain the connections between side rails 42, 44 and cross members 46, 48, so as to lead to fatigue cracking of the connections.

Referring also to FIGS. 4, 5, 6, 7 and 8, sieve support structure 22 of the invention overcomes at least one of the problems of the prior art just described, is shown in greater detail. Support structure 22 includes an upper sieve rail assembly 54 supporting upper sieve 24, and a lower sieve rail assembly 56 supporting lower sieve 26. Upper sieve rail assembly 54 and lower sieve rail assembly 56 can be of the same construction, or can be different, it being preferred that both of the rail assemblies 54 and 56 include the features of the present invention set forth below for overcoming the problems of the prior art rail assemblies discussed above that can result from contemplated loading conditions to be applied thereagainst, particularly uneven loading conditions, and the resultant problems such as cracking and other damage from stress and strain. As a result, details of upper sieve rail assembly 54 are described hereinafter, and will be generally representative also of lower rail assembly 56.

More particularly, upper sieve rail assembly 54 includes an elongate first rail 58, and an elongate second rail 60 extending substantially parallel to first rail 58. Each of rails 58 and 60 is a rigid member, preferably of metal such as steel or aluminum, formed, such as by stamping, into a suitable sectional shape, such as the shape shown. In use, rails 58 and 60 will be disposed and supported extending generally forwardly and rearwardly within an interior cleaning cavity or chamber of a combine, such as combine 20, in spaced apart relation generally beside side sheets enclosing the opposite sides of the cleaning cavity. Rails 58 and 60 are preferably at least generally mirror images of one another, and each preferably includes a longitudinally extending lip 62 or other structure adapted for engaging and supporting a side edge portion of upper sieve 24. Each rail 58 and 60 additionally includes opposite first and second end portions 64 and 66, rails 58 and 60 preferably being oriented such that end portions 64 are located in a rear portion of the combine cleaning region, and end portions 66 located in a more forward portion.

Rail assembly 54 includes rigid elongate compression members 68 and 70 extending and loaded in compression between rails 58 and 60, preferably between end portions 64 thereof at a rear end of rail assembly 54, and between end portions 66 at the opposite forward end. Compression members 68 and 70 are of suitable construction for example, of metal such as steel or aluminum and of a box, channel or L shaped cross section, so as to be sufficiently strong to be capable of withstanding the level of compression loading anticipated to be exerted thereagainst, and material loading conditions, as well as other stresses and strains resulting from externally applied loads, without significant deformation. Compression members 68 and 70 each have opposite end portions 72 and 74 suitably configured for pivotal connection to end portions 64 and 66 of rails 58 and 60, which pivotal connections are also to be capable of withstanding the loading conditions anticipated to be exerted thereagainst.

One suitable manner of pivotal connection of the end portions of the rails and compression members is illustrated including, but not limited to, pivot pins 76 which enable the rails and compression members to be positioned in a desired angular relation one to the other, for instance, a 90° relation as illustrated, so as to impart a preferred generally rectangular overall shape to rail assembly 54, which rectangular shape is adapted for use with rectangular sieves such as upper and lower sieves 24 and 26 shown. Other shapes may alternatively be configured, as desired or required for a particular application, such as, but not limited to, other quadrilateral shapes such as a more trapezoidal shape.

Figure 6:
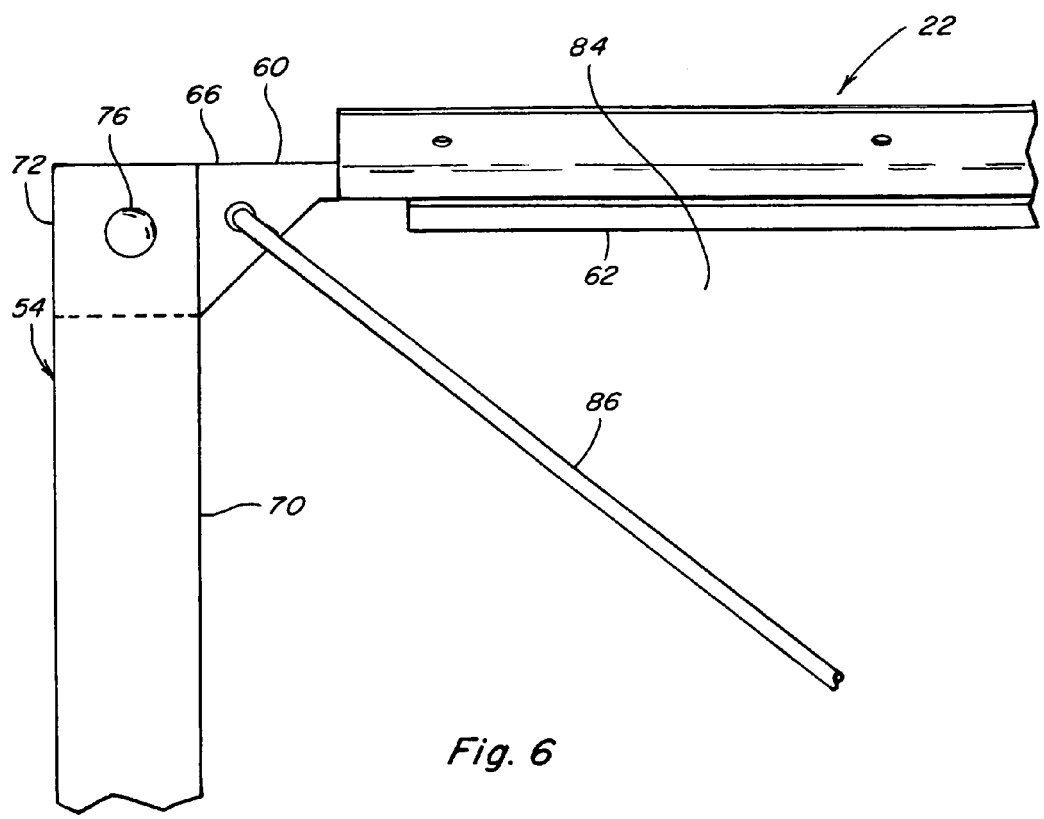
FIG. 6 is a fragmentary top view of the sieve rail assembly of FIG. 5, illustrating a typical pivotal connection between a rail and compression member thereof, and also illustrating connection of a tension member thereto.
Figure 7:
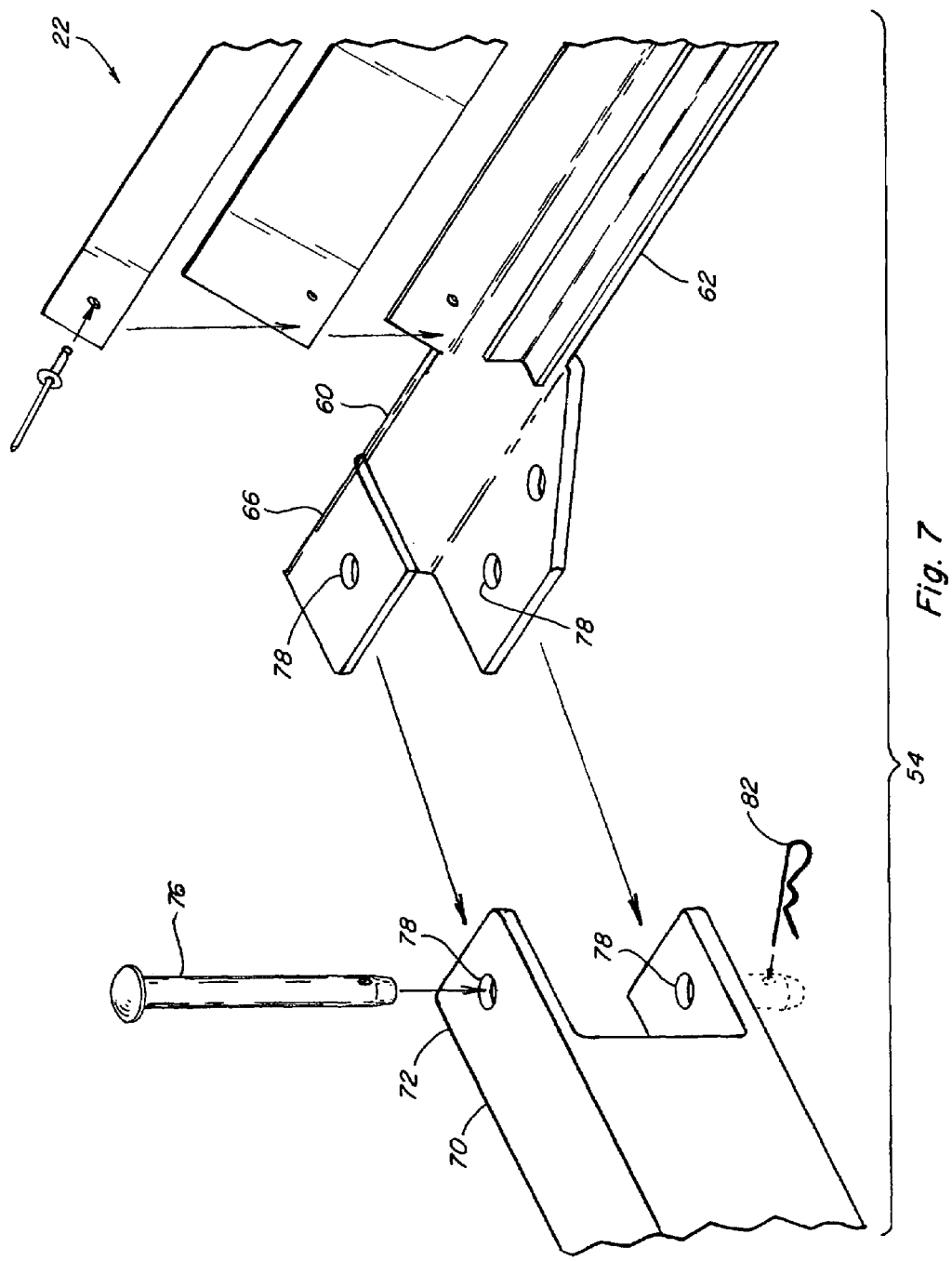
FIG. 7 is a fragmentary perspective exploded view of the sieve rail assembly of FIG. 5, further illustrating a typical pivotal connection between a rail and compression member, and also connection of a wiper to the rail.

Referring in particular to FIGS. 6 and 7, pivotal connection of end portion 66 of rail 60 to end portion 72 of compression member 70 using a pin 76, is illustrated, and is representative of the other pivotal connections between the members. End portion 72 is bifurcated forming a clevis shape configured for cooperatively receiving end portion 66, in overlapping relation thereto. The overlapping end portions 72 and 66 include holes 78 through both upper and lower regions of both end portions positioned and sized to be aligned for receiving a suitable pin 76 for pivotally connecting the rail and compression member, which connection serves to restrict relative twisting movements of the rail and compression member, while still allowing relative pivoting movements thereof perpendicular to the axis of the pin, or in what is essentially the plane of the rail assembly. In operation, loads will be transmitted between the rail and compression member through the pin 76, and the pinned connection will be capable of allowing at least some relative pivoting of the connected members, as opposed to being subjected to fatigue cracking, as would be the case with the prior art welded constructions. Pin 76 is retained by suitable apparatus such as a retaining clip 82 received in a hole 80 extending transversely through pin 76. Alternatively, for instance, a bolt or screw, rivet or other member which allows at least some relative pivotal movement of the rail and compression member could be used.

Figure 4:
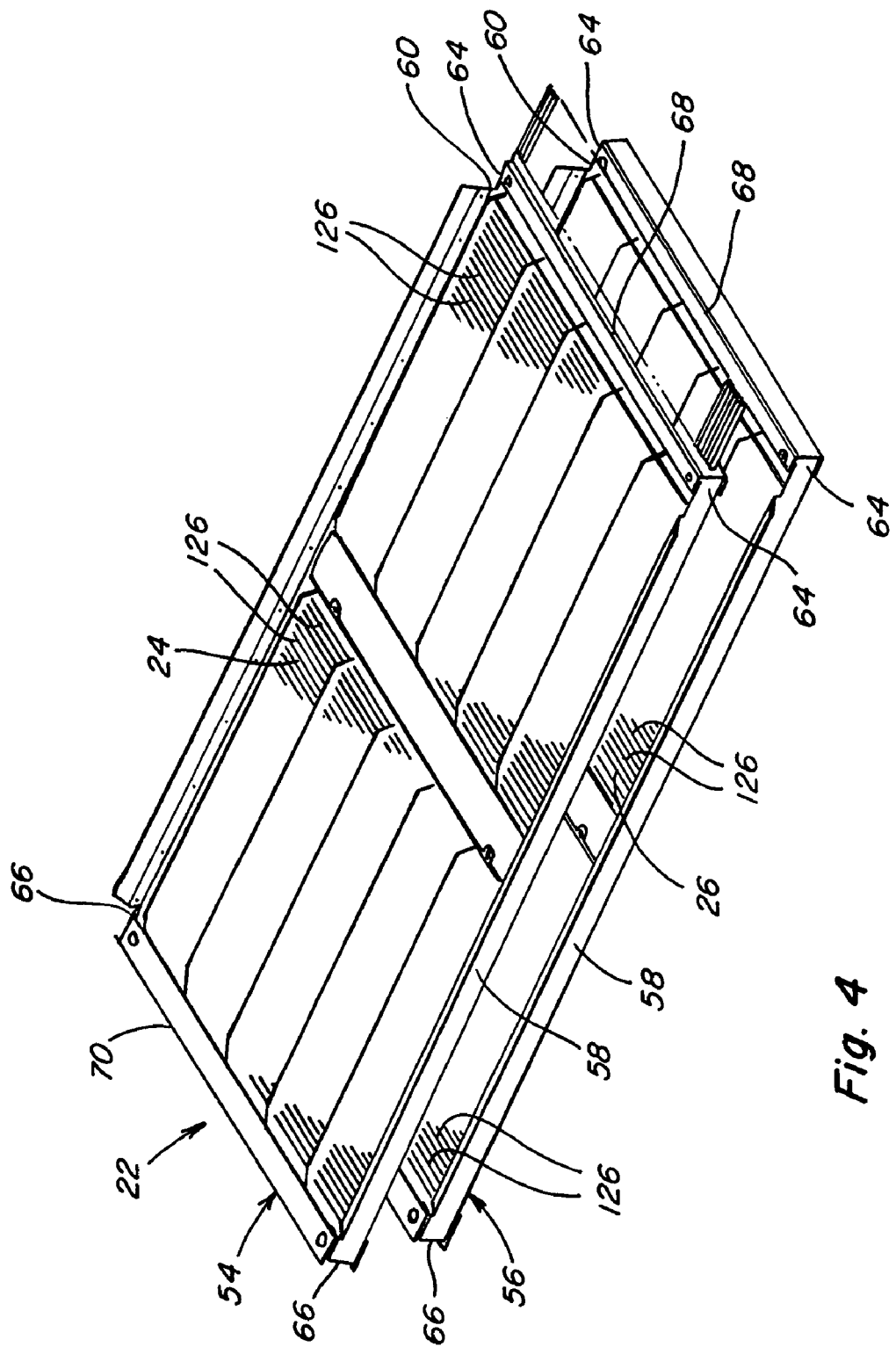
FIG. 4 is a simplified perspective view of the sieves of the combine of FIG. 1, supported by sieve support structure of the invention.
Figure 5:
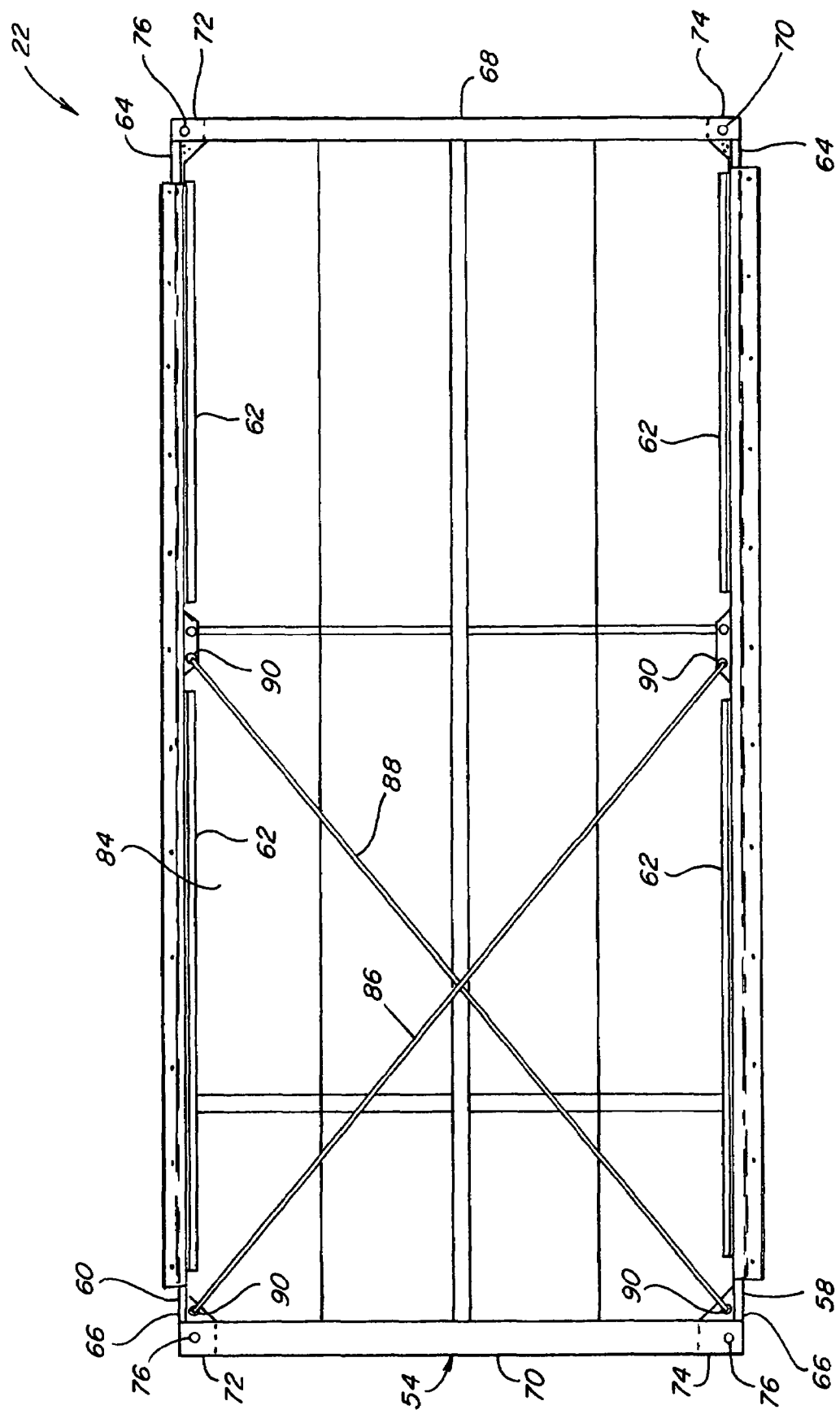
FIG. 5 is a simplified top view of a sieve rail assembly of the support structure of FIG. 4.
Figure 8:
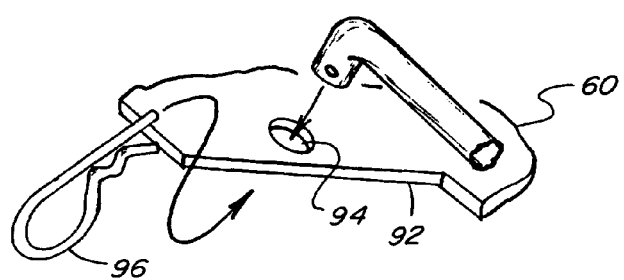
FIG. 8 is another fragmentary perspective view of the sieve rail assembly, illustrating further aspects of connection of the tension member.

Referring in particular to FIGS. 5, 6 and 8, the pivotal connection of rails 58 and 60 with compression members 68 and 70, in combination with the compression loading of compression members 68 and 70, serves to hold rail assembly 54 in the rectangular shape shown, so as to define and enclose a rectangular shaped space configured for receiving upper sieve 24 (FIG. 4). Importantly, this compression loading is preferably achieved using tension members 86 and 88 which extend diagonally across at least a portion of rectangular shaped space 84, and connect to rails 58 and 60 at connections 90, respectively. Here, it can be observed that, in the embodiment shown, tension members 86 and 88 extend across only a portion of rectangular shaped space 84, which can be advantageous as shorter tension members can be used, and it illustrates that, for at least some applications, the tension members need not extend the entire length of the rail assembly. Here also, connections 90 are each relatively simple and comprise a small gusset or tab 92 in connection with the rail 58 or 60, which tab 92 includes a hole 94 adapted for receiving an end of tension member 86 or 88, which can be retained by a retaining clip 96, as illustrated in FIG. 8. Still further, tension members 86 and 88 are illustrated as solid rods, for instance, of a metal such as steel or aluminum, and can be tensioned, for instance, by being stretched or elongated within their elastic range when installed, or after installation by subsequently installing compression members 68 and 70. Preferably, tension members 86 and 88 are equally tensioned sufficiently so as to resiliently hold sieve rail assembly 54 at least substantially to its original rectangular shape, in opposition to a variety of external forces contemplated to be exerted thereagainst, including, but not limited to, those anticipated to arise from uneven loading conditions on sieve 24, and twisting and deformation of surrounding structure of the combine during normal operation. And, in the event that loading conditions are sufficiently great to more substantially deform rail assembly 54 tension members 86 and 88 should preferably have sufficient remaining elasticity to return them to the original shape. Also, tension members 86 and 88 are preferably positioned so as to be disposed beneath sieve 24 when installed, and are of sufficiently small sectional extent so as not to significantly interfere with airflow upwardly through sieve 24 or crop material flow therefrom.

Referring also to FIG. 9, actuator 50 is conventionally constructed and operable for reciprocatingly moving upper and lower sieve rail assemblies 54 and 56 in the forward and rearward directions as denoted by arrows C and explained previously. Essentially, upper sieve rail assembly 54 is supported by both rails thereof for pivotal movement, as denoted by arrow D, by a plurality of pivot arms 98 having upper ends 100 pivotally mounted to suitable structure of combine 20 in the well known manner, such as to side sheets thereof (not shown), and lower ends 102 pivotally connected to rail 58 or 60. Lower sieve rail assembly 56 is connected to upper sieve rail assembly 54 by pivot arms 104 mounted for pivotal movement about a pivot 106, as denoted by arrows E, to suitable structure of combine 20, which can also be an adjacent side sheet. Pivot arms 104 have upper ends 108 pivotally connected to upper rail assembly 54, and lower ends 110 pivotally connected to lower rail assembly 56. A drive arm 112 has a lower end 114 connected in eccentrically rotatably driven relation to an eccentric driver 116 of a conventional powered drive (not shown) such as a shaft drive, belt or chain drive, or an electric or fluid motor drive, and an upper end 118 pivotally connected to upper rail assembly 54. When the drive system is rotated, as denoted by arrow F, drive arm 112 causes reciprocating movement of upper rail assembly 54, as denoted by arrow C, which reciprocatingly pivots pivot arm 104 about pivot 106, as denoted by arrows E, to reciprocatingly move lower rail assembly 56, oppositely in relation to assembly 56, as also denoted by arrow C. Again, it should be noted that other reciprocating or vibrating drive systems can be used.

Figure 10:
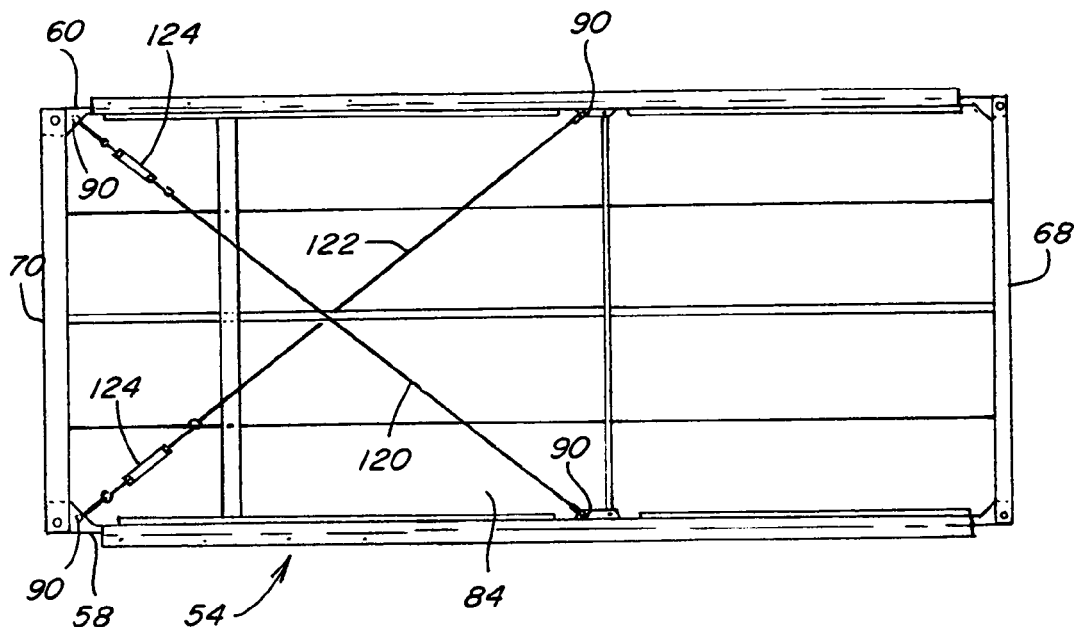
FIG. 10 is a top view of a support structure of a sieve rail assembly the invention, including alternative tension members having adjustable tensioning elements.

Referring also to FIG. 10, upper sieve rail assembly 54 is shown including alternative tension members 120 and 122 which are cables instead of rods such as exemplified by tension members 86 and 88. Tension members 120 and 122, like tension members 86 and 88 discussed above, extend diagonally across rectangular shaped space 84, and connect to rails 58 and 60 at connections 90, respectively. Tension members 120 and 122 are cables, for instance, of a metal such as steel or aluminum, and can be tensioned, for instance, by being stretched or elongated within their elastic range when installed, or after installation by subsequently installing compression members 68 and 70. As another alternative, tension members 120 and 122 can include optional tensioning elements 124, which can comprise, for instance, commercially available turnbuckles of conventional construction. Preferably, tension members 120 and 122 are equally tensioned sufficiently so as to resiliently hold sieve rail assembly 54 at least substantially to its original rectangular shape, in opposition to a variety of external forces contemplated to be exerted thereagainst, including, but not limited to, those anticipated to arise from uneven loading conditions and twisting and deformation of surrounding structure of the combine during normal operation. And, in the event that loading conditions are sufficiently great to more substantially deform rail assembly 54 tension members 120 and 122 should have sufficient remaining elasticity to return them to the original shape. Also, tension members 120 and 122 are preferably positioned so as to be disposed beneath sieve 24 (FIG. 4) when installed, and are of sufficiently small sectional extent so as not to significantly interfere with airflow upwardly through the sieve or crop material flow therefrom.

Figure 11:
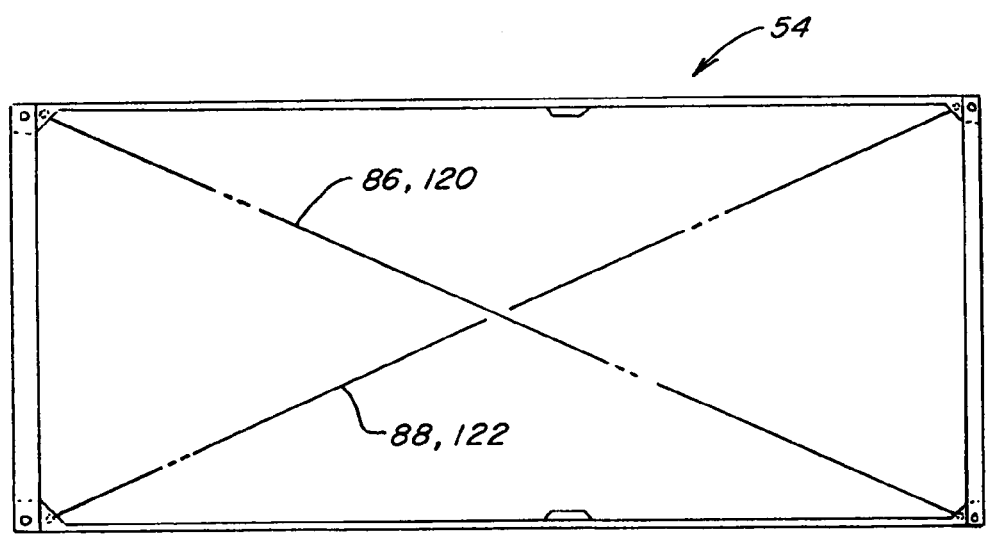
FIG. 11 is a top view of a support structure of a sieve rail assembly the invention, including another alternative arrangement of tension members according to the invention.

Referring also to FIG. 11, upper sieve rail assembly 54 is shown with an alternative arrangement for tension members 86 and 88 or 120 and 122, wherein the tension members extend diagonally across the entire length of rail assembly 54.

Referring again to FIGS. 3 and 4, sieves 24 and 26 are each preferably of well known construction, including a plurality of elongate, horizontally extending slats 126 pivotable about a sidewardly extending generally horizontal pivotal axis. Each slat 126 is composed of a plurality of parallel, longitudinally spaced upward and downwardly inclined fingers, the fingers of adjacent ones of slats 126 defining sieve openings therebetween, for the passage of only plant material of a desired maximum size therethrough, i.e., clean grain. Slats 126 are simultaneously pivotable about the respective pivotal axes through a range of pivotable positions for varying the opening size of the sieve in the well known conventional manner. Sieves 24 and 26 can each comprise a single member or assembly, or can be divided into sections, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A support structure for a sieve of an agricultural combine, comprising:
   an elongate first rail;
   an elongate second rail at least substantially parallel to the first rail;
   rigid elongate compression members pivotally connected to and extending between the first and second rails at longitudinally spaced locations therealong, respectively, the rails and the compression members forming a rail assembly having a predetermined shape bounding a space of the predetermined shape, the rail assembly being configured for supporting a generally flat sieve of a cleaning system in at least substantially covering relation to the space, wherein the compression members are pivotally connected to the end portions of the first and second rails, respectively, by pins; and
   elongate tension members extending generally diagonally through the space and having opposite end portions connected to the first and second rails, respectively, the tension members being tensioned so as to simultaneously urge the rails against the compression members so as to apply a compression load thereagainst for retaining the rail assembly in the predetermined shape.

2. The support structure of claim 1, wherein at least one of the tension members comprises a rod.

3. The support structure of claim 1, wherein at least one of the tension members comprises a cable.

4. The support structure of claim 1, wherein the predetermined shape is an at least generally rectangular shape, and the tension members cross at about a center region of the space.

5. The support structure of claim 1, further comprising a generally flat sieve supported on the rail assembly in substantially covering relation to the space.

6. The support structure of claim 5, further comprising an actuator in connection with the rail assembly and operable for moving the assembly and the sieve reciprocatingly in a predetermined direction generally parallel to at least one of the first and second rails.

7. The support structure of claim 6, wherein the rail assembly supports a second rail assembly supporting a second sieve for reciprocating movement in the predetermined direction.

8. Sieve apparatus for a cleaning system of an agricultural combine, comprising:
   a generally flat sieve having a predetermined at least generally rectangular shape and a plurality of openings therethrough;
   a generally rectangular rail assembly supporting the sieve about a periphery thereof, the rail assembly including an elongate first rail having a first end portion and an opposite second end portion, an elongate second rail having a first end portion and an opposite second end portion, a rigid elongate first compression member extending between the first end portions of the first and second rails and pivotally connected thereto, respectively, a rigid elongate second compression member extending between the second end portions of the first and second rails and pivotally connected thereto, respectively, wherein the rails and the compression members bound a generally rectangular shaped space covered by the sieve, and elongate tension members extending generally diagonally across the rectangular shaped space and having opposite end portions connected to the first and second rails, respectively, the tension members being tensioned so as to simultaneously pull the rails against the compression members so as to apply a compression load thereagainst for holding the rail assembly in the generally rectangular shape, wherein the compression members are pivotally connected to the end portions of the first and second rails, respectively, by pins.

9. Sieve apparatus of claim 8, wherein at least one of the tension members comprises a rod.

10. Sieve apparatus of claim 8, wherein at least one of the tension members comprises a cable.

11. Sieve apparatus of claim 8, wherein the tension members cross at about a central region of the rectangular shaped space.

12. Sieve apparatus of claim 8, further comprising an actuator in connection with the rail assembly and operable for moving the rail assembly reciprocatingly in a predetermined direction generally parallel to at least one of the first and second rails.

13. Sieve apparatus of claim 12, wherein the rail assembly supports a second rail assembly supporting a sieve for reciprocating movement in the predetermined direction.

14. A support structure for a sieve of a cleaning system of an agricultural combine, comprising:
   an elongate first rail having a first end portion and an opposite second end portion;
   an elongate second rail having a first end portion and an opposite second end portion;
   a rigid elongate first compression member extending between the first end portions of the first and second rails and pivotally connected thereto, respectively;
   a rigid elongate second compression member extending between the second end portions of the first and second rails and pivotally connected thereto, respectively, wherein the rails and the compression members form a generally flat, at least generally rectangular shaped rail assembly bounding a generally rectangular shaped space, the rail assembly being configured for supporting a generally flat, generally rectangular planar sieve in at least substantially covering relation to the rectangular shaped space, wherein the compression members are pivotally connected to the end portions of the first and second rails, respectively, by pins; and
   elongate tension members extending generally diagonally through the rectangular shaped space and having opposite end portions connected to the first and second rails, respectively, the tension members being loaded in tension so as to simultaneously urge the rails against the compression members so as to apply a compression load thereagainst for retaining the rectangular shape of the rail assembly in opposition to forces exerted thereagainst urging the assembly from the rectangular shape.

15. The support structure of claim 14, wherein at least one of the tension members comprises a rod.

16. The support structure of claim 14, wherein at least one of the tension members comprises a cable.

17. The support structure of claim 14, wherein the tension members cross at about a center of the rectangular shaped space.

18. The support structure of claim 14, further comprising a generally flat, rectangular sieve supported on the rail assembly in covering relation to the rectangular shaped space.

19. The support structure of claim 14, further comprising an actuator in connection with the rail assembly and operable for moving the rail assembly reciprocatingly in the predetermined direction.

20. The support structure of claim 19, wherein the rail assembly supports a second rail assembly for reciprocating movement relative thereto in the predetermined direction.

* * * * *